US011355121B2

(12) United States Patent
Lau et al.

(10) Patent No.: US 11,355,121 B2
(45) Date of Patent: Jun. 7, 2022

(54) SYSTEM AND METHOD FOR SOFTWARE APPLICATION EXTENSIONS

(71) Applicant: ROYAL BANK OF CANADA, Montreal (CA)

(72) Inventors: Alex Tak Kwun Lau, Montreal (CA); Arup Saha, Montreal (CA)

(73) Assignee: ROYAL BANK OF CANADA, Toronto (CA)

( * ) Notice: Subject to any disclaimer, the term of this patent is extended or adjusted under 35 U.S.C. 154(b) by 120 days.

(21) Appl. No.: 16/597,507

(22) Filed: Oct. 9, 2019

(65) Prior Publication Data

US 2020/0111494 A1  Apr. 9, 2020

Related U.S. Application Data

(60) Provisional application No. 62/743,408, filed on Oct. 9, 2018.

(51) Int. Cl.
| | | |
|---|---|---|
| *G10L 15/26* | (2006.01) |
| *G10L 15/22* | (2006.01) |
| *G06F 9/451* | (2018.01) |
| *G06F 21/32* | (2013.01) |
| *G06Q 20/10* | (2012.01) |
| *H04L 51/046* | (2022.01) |
| *G06F 9/445* | (2018.01) |

(52) U.S. Cl.
CPC .......... *G10L 15/26* (2013.01); *G06F 9/44526* (2013.01); *G06F 9/451* (2018.02); *G06F 21/32* (2013.01); *G06Q 20/108* (2013.01); *G10L 15/22* (2013.01); *H04L 51/046* (2013.01)

(58) Field of Classification Search
USPC .......... 704/246, 247, 251, 252, 275
See application file for complete search history.

(56) References Cited

U.S. PATENT DOCUMENTS

| 10,949,228 B1* | 3/2021 | Graham ................. G06F 9/453 |
| 10,972,607 B1* | 4/2021 | Graham ............. H04M 3/5166 |
| 2006/0206709 A1* | 9/2006 | Labrou ............. G06Q 20/4014 713/167 |
| 2017/0126509 A1* | 5/2017 | Jones-McFadden ........................ H04L 41/0803 |
| 2017/0126749 A1* | 5/2017 | Jones-McFadden ........................ H04L 65/1069 |

(Continued)

*Primary Examiner* — Leonard Saint Cyr
(74) *Attorney, Agent, or Firm* — Norton Rose Fulbright Canada LLP

(57) ABSTRACT

The description relates to systems and methods for extending applications. For example, a voice assistant application can be the application to be extended. In an example, a mobile banking application can be the application that provides the extension. For example, a voice assistant might not have capability to conduct fingerprint (or biometric) authentication and bill payment function. An extension point within the voice assistant application that would enable this kind of capability might not exist. The mobile banking application can have a biometric tool for fingerprint authentication capability and a payment tool for a bill payment or money transfer function. Embodiments described herein can involve a deep link from the voice assistant application to the mobile banking application (which does offer fingerprint authentication and bill payment capability). The navigation to the mobile banking application can generate a visual impression at the UI similar or consistent with the voice assistant application.

21 Claims, 14 Drawing Sheets

(56) References Cited

U.S. PATENT DOCUMENTS

| | | | |
|---|---|---|---|
| 2019/0108542 A1* | 4/2019 | Durvasula | G06Q 20/3829 |
| 2020/0014642 A1* | 1/2020 | Sidi | G06Q 30/0633 |
| 2020/0045041 A1* | 2/2020 | Heidari | H04L 63/0861 |
| 2020/0057602 A1* | 2/2020 | Sarir | G06F 3/167 |
| 2020/0057603 A1* | 2/2020 | Sarir | G06F 3/167 |
| 2020/0112526 A1* | 4/2020 | Moon | G06N 3/006 |

\* cited by examiner

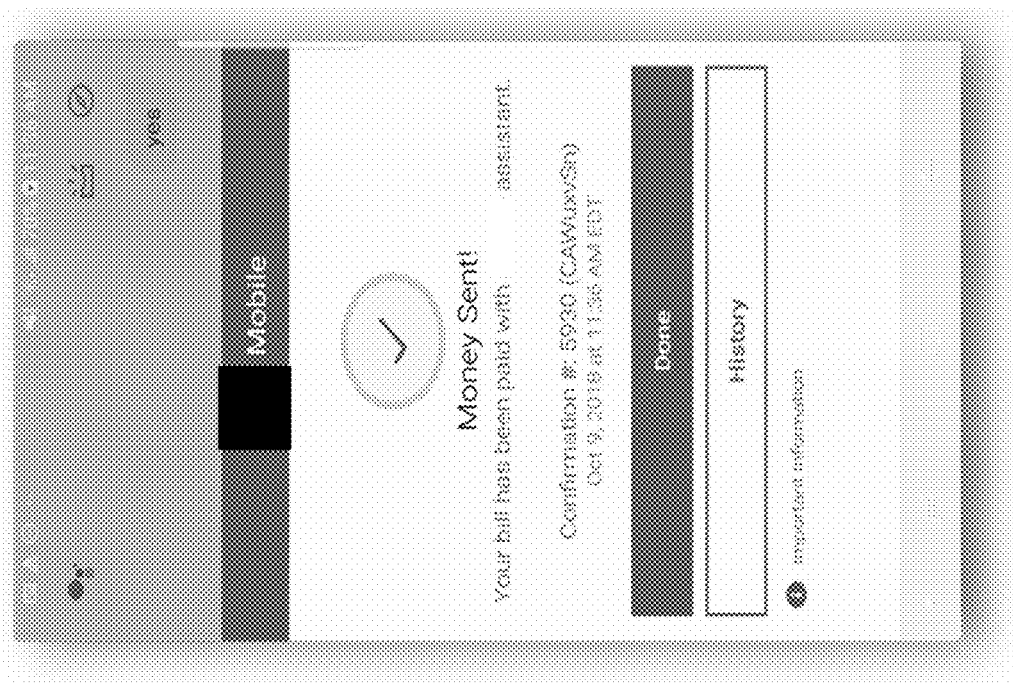
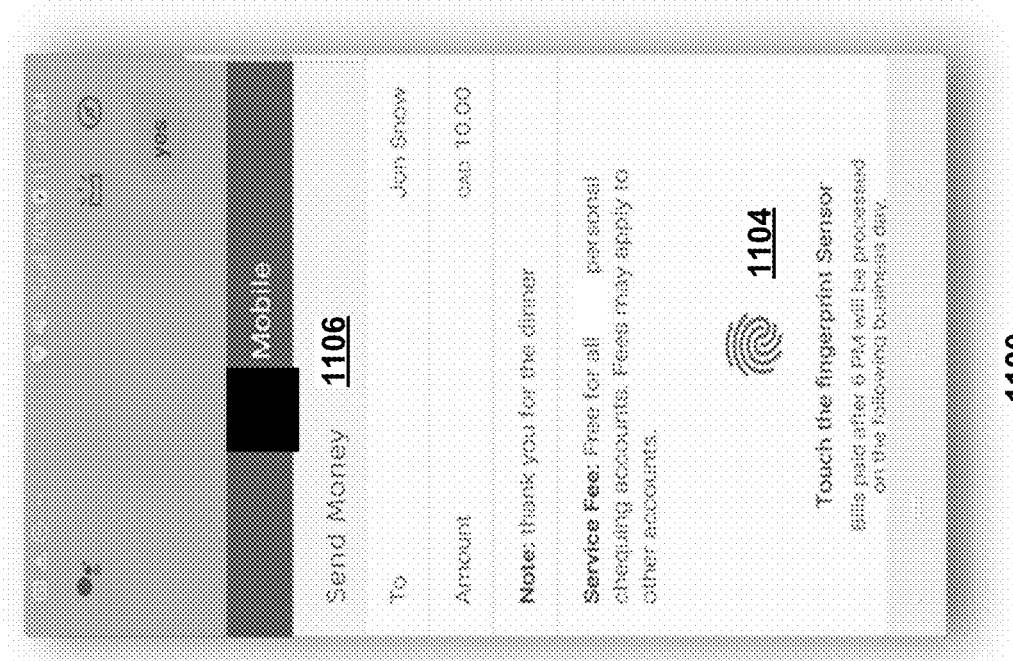
FIG. 11

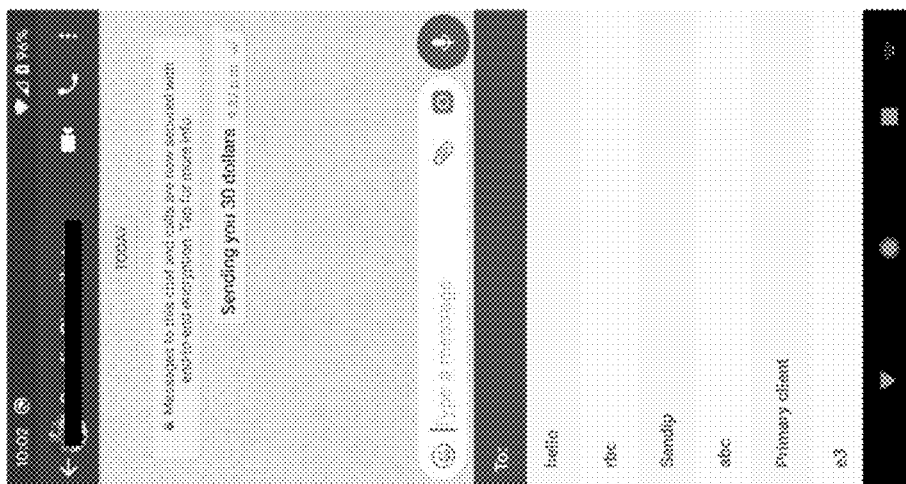
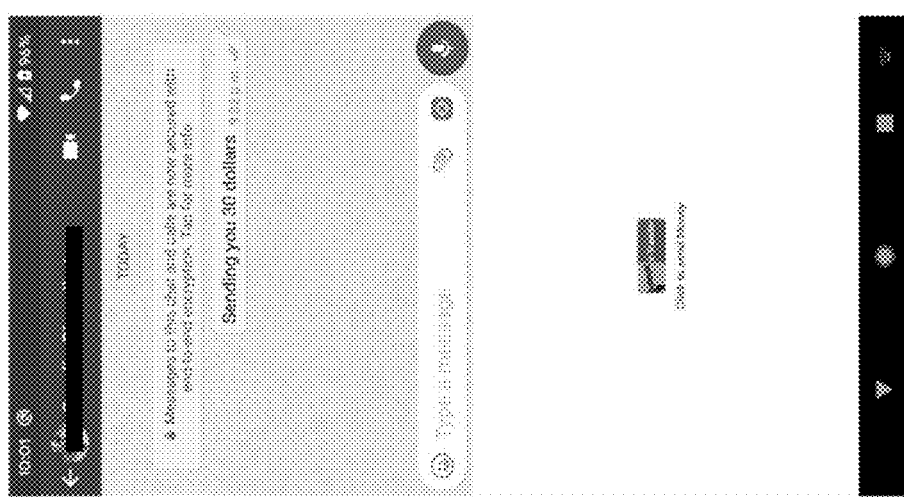
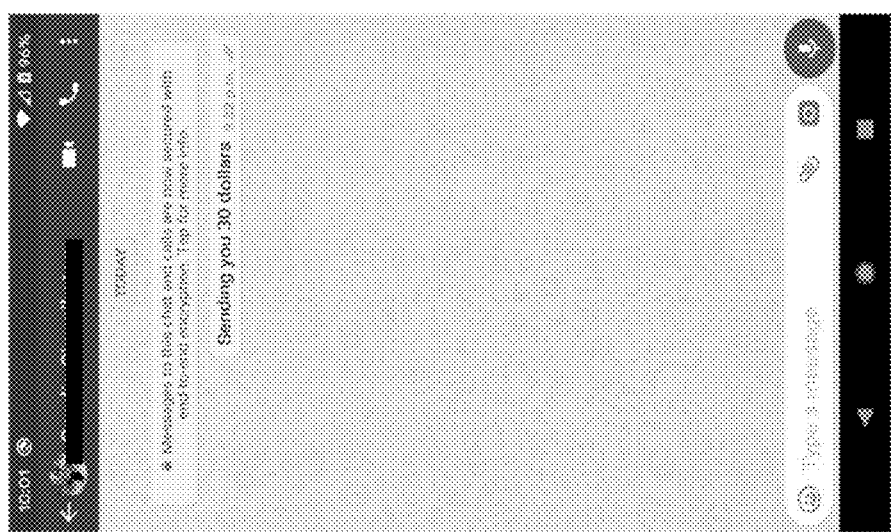
FIG. 12

SYSTEM AND METHOD FOR SOFTWARE APPLICATION EXTENSIONS

FIELD

The present disclosure generally relates to the field of computer application interfaces.

INTRODUCTION

Embodiments described herein relate to extending features or functions of an application using deep links. A deep link can refer to a hyperlink that links to content or a location of a website or application. The link contains the information needed to point to a particular item of content, for example.

SUMMARY

In accordance with an aspect, there is provided systems and methods for extending applications to add additional program functionality. For example, a voice assistant application can be the application to be extended with additional program functionality. In an example, a mobile banking application can be the application that provides the extension of additional program functionality. For example, a voice assistant might not have capability to conduct fingerprint (or biometric) authentication and bill payment function. An extension point within the voice assistant application that would enable this kind of capability might not exist. The mobile banking application can have a biometric tool for fingerprint authentication capability and a payment tool for a bill payment or money transfer function. Embodiments described herein can involve a deep link from the voice assistant application to the mobile banking application to enhance the program functionality of the voice assistant application. For example, additional program functionality can include fingerprint authentication and bill payment capability. The application can be extended while maintaining a consistent user experience across the different applications. For example, the navigation to the mobile banking application can generate a visual impression at the user interface similar or consistent with the interface of the voice assistant application. Accordingly, systems and methods for described herein can extend an application to add, expand or enhance program functionality of the application with new or different program functions.

In accordance with an aspect, there is provided a method for extending an application of a computer system. The method involves: receiving, at an interface for a first application, a command to activate a deep link within the first application, the deep link having executable instructions for directing one or more processors to a program function of a second application, the program function not provided by the first application; activating the deep link to direct the interface to the program function of the second application using the one or more processors; and maintaining a consistent user experience at the interface while executing the program function of the section application.

In some examples, the consistent user experience is a consistent visual appearance.

In some embodiments, the method involves automatically displaying, within the interface, visual elements for the first application and additional visual elements for the second application, the additional visual elements configured to have a similar visual appearance to the visual elements for the first application.

In some embodiments, the first application is a voice assistant application, wherein the second application is a mobile banking application, wherein the program function is a bill payment function and a biometric authentication function, wherein the method involves: receiving, at the interface, a voice command to activate the mobile banking application; generating a voice response to request the payee and amount using natural language processing; receiving utterances to generate entity.payee and entity.amount variables; storing the entity.payee and entity.amount variables; generating the deep link embedding the entity.payee and entity.amount variables; activating the deep link to present a model dialog to enable the bill payment function and the biometric authentication function.

In accordance with an aspect, there is provided a method for extending an application of a computer system. The method involves: receiving, at an interface for the application, a command to activate a deep link within the application, the deep link having executable instructions for directing one or more processors to a program function of an extension application, the program function not provided by the application; activating the deep link to direct the interface to the program function of the extension application using the one or more processors; and maintaining a consistent user experience at the interface using data or parameters of the deep link while executing the program function of the extension application.

In accordance with an aspect, there is provided non-transitory computer readable storage medium with executable instructions for causing one or more processors to extend a first application by: configuring a deep link within the first application to direct the processor to a program function of a second application, the program function not provided by the first application; and upon activation of the deep link, directing an interface of the first application to the program function of the second application and updating the interface to implement the program function; maintaining a consistent user experience at the interface while executing the program function of the section application.

In some embodiments, maintaining the consistent visual appearance at the interface involves configuring visual elements for the first application and visual elements for the second application to display at the interface with a similar visual appearance and displaying the visual elements for the first application and the visual elements for the second application at the interface.

In some embodiments, maintaining the consistent visual appearance at the interface involves displaying, within the interface, additional visual elements for the second application, the additional visual elements configured to have a similar visual appearance to visual elements for the first application.

In some embodiments, the deep link creates an extension of the first application that would otherwise not be extensible due to the lack of an appropriate extension point.

In some embodiments, the deep link creates an extension in the form of a model dialog or updates the interface to resemble a model dialog.

In some embodiments, the deep link directs the interface to a user interface of an application of the second application, the application providing the program function.

In some embodiments, the first application is a voice assistant application.

In some embodiments, the second application is a mobile banking application.

In some embodiments, the program function is biometric authentication.

In some embodiments, the program function is fingerprint authentication.

In some embodiments, the program function is a bill payment or money transfer function.

In some embodiments, the first application is a notification drawer.

In some embodiments, the first application is an email application for money transfer.

In some embodiments, the processor can update the interface to with a model dialog to implement the program function.

In some embodiments, the processor can transmit requests for parameters for the program function, receive input data for variables for the parameters, store the variables for the parameter, and encodes the variables in the deep link.

In some embodiments, the second application can parse the deep link to extract the encoded variables for the program function.

In some embodiments, the deep link indicates a feature or point in the second application to access.

In some embodiments, the deep link can enable the second application to identify that the source of the deep link is the first application.

In some embodiments, the first application is a voice assistant application, wherein the second application is a mobile banking application, wherein the program function is a bill payment function and a biometric authentication function, wherein the executable instructions cause the one or more processors to extend the first application by: receiving a voice command to activate the mobile banking application; generating a voice response to request the payee and amount using natural language processing; receiving utterances to generate entity.payee and entity.amount variables; storing the entity.payee and entity.amount variables; generating the deep link embedding the entity.payee and entity.amount variables; activating the deep link to present a model dialog to enable the bill payment function and the biometric authentication function.

In accordance with an aspect, there is provided a system for extending an application. The system can have non-transitory computer readable storage medium with executable instructions for causing one or more processors to configure a deep link within a first application to direct the processor to a program function of a second application, the program function not provided by the first application, upon activation of the deep link, directing an interface to the program function of the second application, and updating the interface to implement the program function while maintaining a consistent visual appearance at the interface.

In some embodiments, the deep link creates an extension of the first application that would otherwise not be extensible due to the lack of an appropriate extension point.

In some embodiments, the deep link creates an extension in the form of a model dialog or updates the interface to resemble a model dialog.

In some embodiments, the deep link directs to the interface to a user interface of an application of the second application, the application providing the program function.

In some embodiments, the first application is a voice assistant application.

In some embodiments, the second application is a mobile banking application.

In some embodiments, the program function is biometric authentication.

In some embodiments, the program function is fingerprint authentication.

In some embodiments, the program function is a bill payment or money transfer function.

In some embodiments, the first application is a notification drawer.

In some embodiments, the first application is an email application for money transfer.

In some embodiments, the processor can update the interface to with a model dialog to implement the program function.

In some embodiments, the processor can transmit requests for parameters for the program function, receive input data for variables for the parameters, store the variables for the parameter, and encodes the variables in the deep link.

In some embodiments, the second application can parse the deep link to extract the encoded variables for the program function.

In some embodiments, the deep link can enable the second application to identify that the source of the deep link is the first application.

In some embodiments, the first application is a voice assistant application, wherein the second application is a mobile banking application, wherein the program function is a bill payment function and a biometric authentication function, wherein the processor is configured to: receive a voice command to activate the mobile banking application; generate a voice response to request the payee and amount using natural language processing; receive utterances to generate entity.payee and entity.amount variables; store the entity.payee and entity.amount variables; generate the deep link embedding the entity.payee and entity.amount variables; and activate the deep link to present a model dialog to enable the bill payment function and the biometric authentication function.

In another aspect, there is provided a system for extending an application that involves non-transitory computer readable storage medium with executable instructions for causing one or more processors to configure a deep link within a first application to direct the processor to a program function of a second application, the program function not provided by the first application, upon activation of the deep link, directing an interface to the program function of the second application, and updating the interface to implement the program function using visual elements configured to have a similar visual appearance to the interface.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

FIG. 11 shows example interfaces for a banking application.

FIG. 12 shows example interfaces for a message application.

DETAILED DESCRIPTION

Embodiments of methods, systems, and apparatus are described through reference to the drawings.

Systems and methods described herein can extend applications to add additional program functionality. For example, a voice assistant application can be the application to be extended with additional program functionality, from, for example, a mobile banking application. The voice assistant might not have capability to conduct fingerprint (or biometric) authentication and bill payment function which may be program functions provided by the mobile banking application. The voice assistant application can be configured with a deep link to the mobile banking program function(s). The program functions can be a biometric tool for fingerprint authentication capability and a payment tool for a bill payment or money transfer function. Embodiments described herein can involve a deep link from the voice assistant application to the mobile banking application to enhance the program functionality of the voice assistant application. The application can be extended while maintaining a consistent user experience across the different applications. For example, the navigation to the mobile banking application can generate a visual impression at the user interface similar or consistent with the interface of the voice assistant application. The deep link can automatically update the interface to display visual elements corresponding to the program functions of the mobile banking application. The interface can automatically display the visual elements to have a consistent visual appearance to visual elements in the interface that correspond to the voice assistant. A consistent user experience is maintained while extending program functionality. This can make it look like user is still on the same page or on the same application. From the user perspective, they might not notice the transition between the applications. It may feel like the same user experience context which can make user comfortable. The user experience across multiple applications can be much less jarring as there can be fewer screen transitions.

Deep links can refer to links (e.g. URLs) to specific content on another website. A deep link can be a navigational tool that allows the user to land at specific content without the navigational overhead associated with nested content. Embodiments described herein can generate a deep link to be embedded within a first application to extend the first application with program functions of a second application. The deep link can be a URL, for example. The deep link can contain the necessary parameters that are utilized by the deep link extension to provide the consistent user experience and contextual information.

Figure 1:
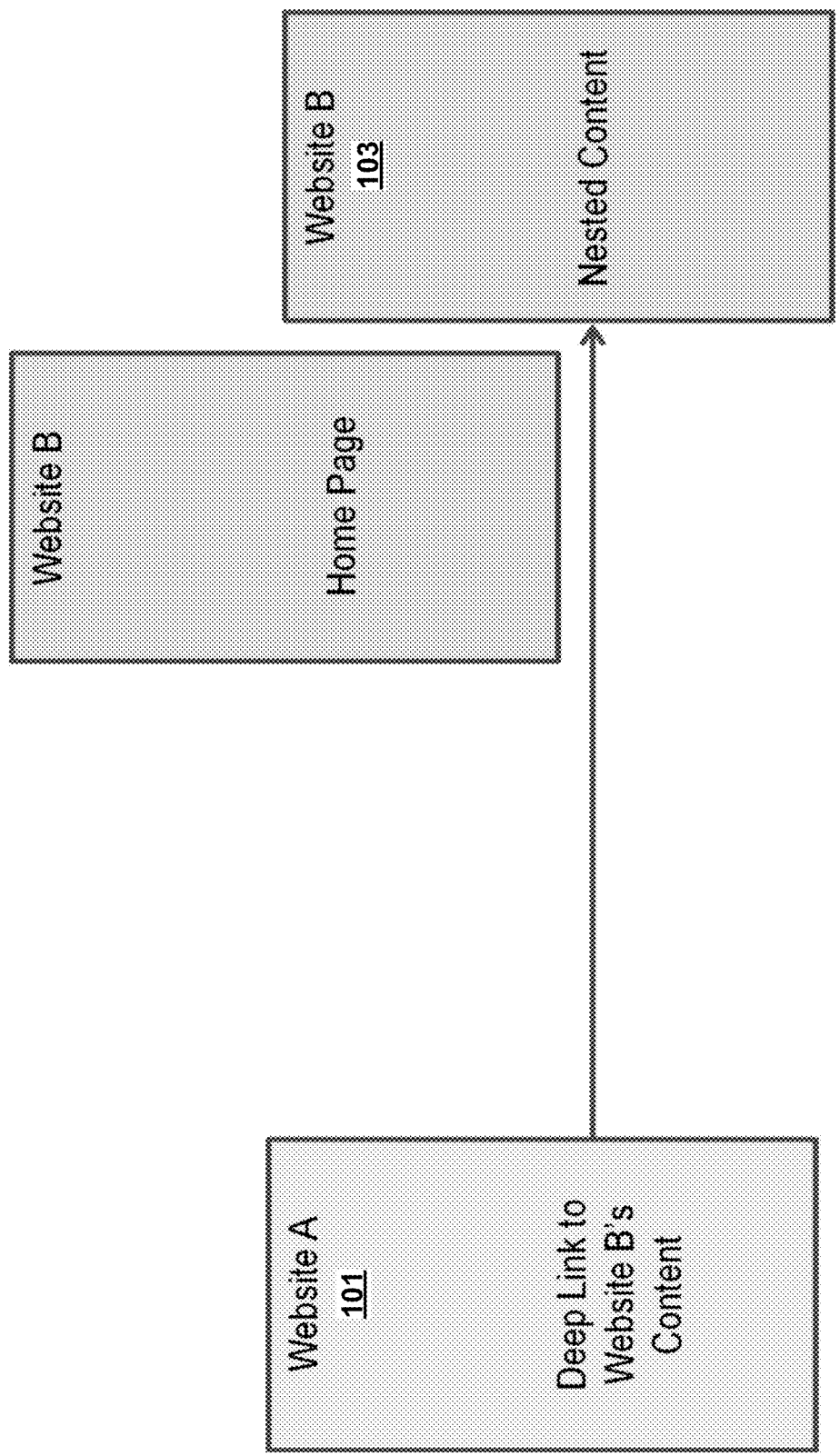
FIG. 1 is a diagram showing an example deep link from website A to nested content at website B.

FIG. 1 is a diagram showing an example deep link from website A 101 to nested content at website B 103. The deep link is a link to the nested content of website B 103 and not to the homepage of the website B, for example. The deep link navigates an interface (e.g. at a display device of the user) from website A 101 to the nested content of website B 103.

Mobile deep links are links (e.g. URIs) to navigate or direct a device to specific locations within a mobile application. Mobile deep links are a navigational tool that, for example, allows you to launch the video mobile application directly into a specific video.

Figure 2:
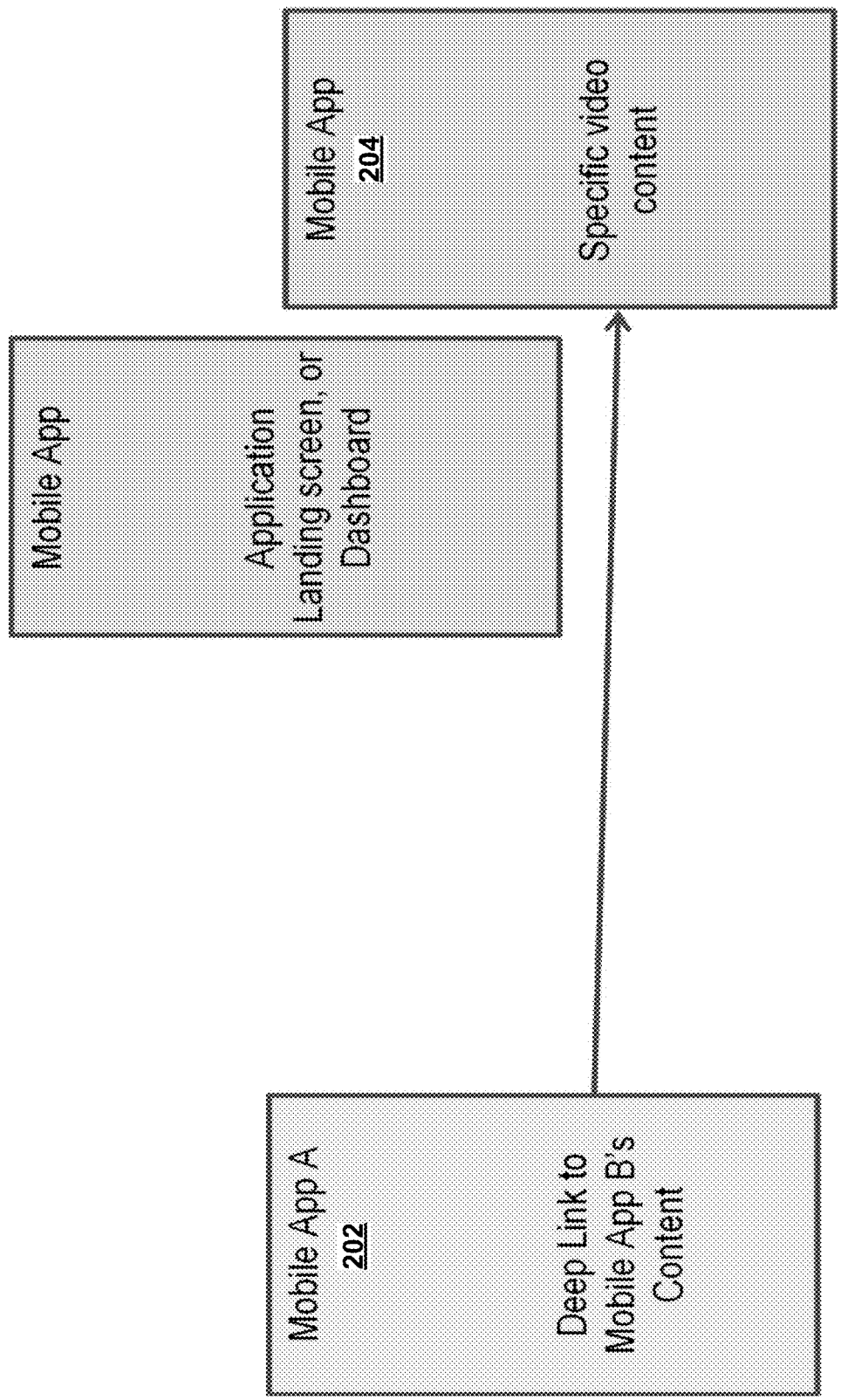
FIG. 2 is a diagram showing an example mobile deep link from mobile application A to content at mobile application B.

FIG. 2 is a diagram showing an example mobile deep link from mobile application A 202 to content (e.g. video content) at mobile application B 204. The deep link is a link to the content of mobile application B 204 and not to the application landing screen or dashboard of the mobile application B, for example. The deep link navigates an interface (e.g. at a mobile device of the user) from mobile application A 202 to the specific content of mobile application B 204.

An application extension can be a supplementary routine or program that adds capabilities or program functionality to an existing application. An application extension provides the ability for applications to grow, enhance or extend its capabilities (e.g. features, functions).

Application extensions can involve extension points. The extension points can define a contract between the application and its extensions to define what the extension is to conform with. This can be in the form of an application programming interface (API). Extension points can define not only how an application extends its capabilities, but also what is extendable on an application. An extension point can be a formal declaration in a file of the application where customization (or extension) is allowed or permitted by the application.

Embodiments described herein leverage deep links to create extensions of an application that would otherwise not be extensible due to the lack of an appropriate extension point. That is, embodiments described herein can extend applications using deep links instead of extension points. The extension point can be controlled by a developer of the application which may not be modifiable by another developer, for example. An application extension point, also known as a plug-in, can require a host application (also referred to as the application to be extended) to provide services for the extension to use. This includes mechanisms for the extensions to register themselves and a protocol for the exchange of data. The extensions can depend on the host application and are not stand-alone applications. Furthermore, the plug-ins can be loaded by the host application in a prescribed location (also known as the plugin execution environment). Support for extension points are pre-mediated, well defined and fixed at the point of publishing in terms of functionality and capabilities. Conversely, deep-links can be provided as a navigation mechanism, typically (but not limited to) using hypertext transfer protocol (HTTP). Due to the open ended nature of navigation, there are no protocols to pre-define nor services to be provided as the destination of the deeplink can be able to point to anything. Furthermore, any number of contextual information may be passed as parts of the links (for example, as query parameters in the case of HTTP).

Embodiments described herein provide an application extension implemented as the target of a deep link. Deep links are navigational tools. A device can activate the deep link which can result in a contextual change in a visual interface (e.g. navigating to a separate page, or even a separate application). This can be contradictory to the user's expectation if the invoked capability is an application extension.

Embodiments described herein can implement an extension in the form of a model dialog, or a user interface that resembles a dialog to impress upon the user that no contextual change has occurred. The user may get the impression that they are still interacting with the originating application when in fact they are not (e.g. interacting with the extension).

Figure 3:
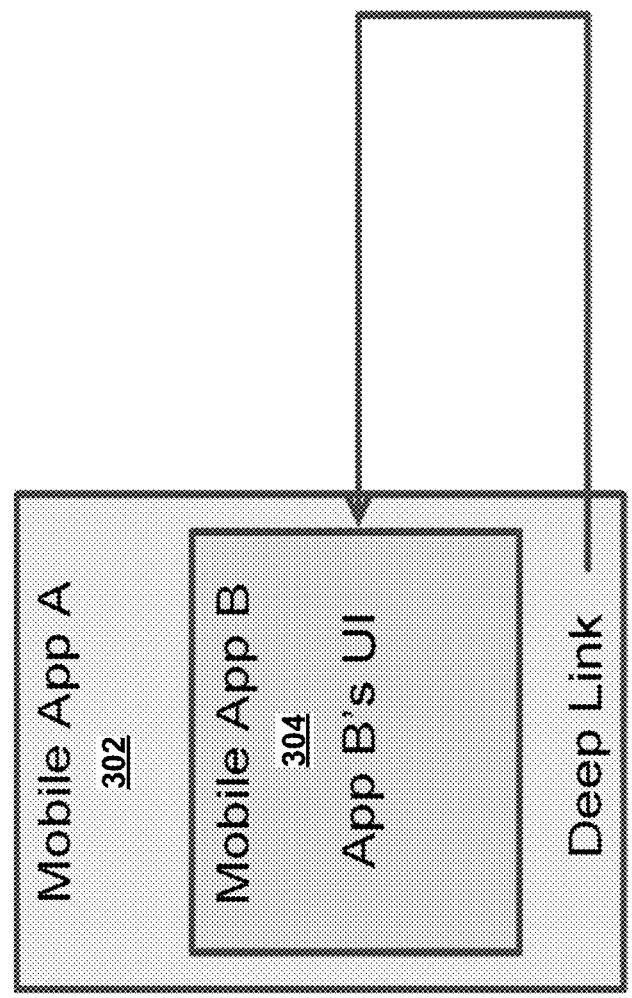
FIG. 3 depicts an application extension implemented as a deep link target.

For example, FIG. 3 depicts an application extension implemented as a deep link target. In this example, mobile application B 304 is (or contains code that is) the extension for mobile application A 302. Mobile application A 302 has a deep link to a user interface (UI) of application B (of mobile application B). That is, application B has a UI which is the target of the deep link from mobile application A. The UI (of application B) presents itself in the form of a model dialog. This can give the user the impression that they have not left mobile application A and are still interacting with mobile application A but are in fact interacting with application B (e.g. the application extension). The UI maintains a consistent visual appearance between visual elements for the different applications. Embodiments described herein can generate a deep link and embed the deep link within an application to extend the application with program functions of another application while maintaining a consistent user experience. The deep link can be a URL, for example. The deep link can contain parameters or data that can be used by the deep link extension to provide the consistent user experience and contextual information. The data or parameters can indicate the source or originating application to be used to configure elements of the program function of the extension application. For example, the UI can maintain a consistent visual appearance between visual elements for multiple applications using the contextual information and parameters of the deep link.

Figure 4:
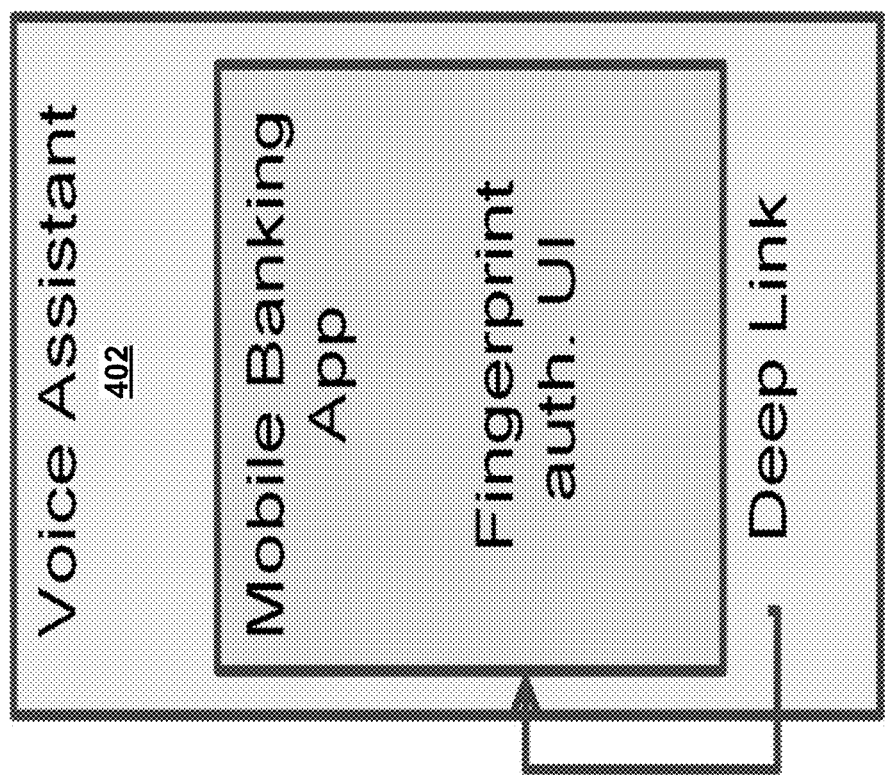
FIG. 4 depicts an application extension for a voice assistant as an example use case.

FIG. 4 depicts an application extension for a voice assistant 402 as an example use case. A voice assistant can be the application to be extended. In this example, a mobile banking application can be the application that provides the extension. For example, a voice assistant might not have capability to conduct fingerprint (or biometric) authentication. An extension point within the voice assistant that would enable this kind of capability might also not exist. Embodiments described herein can involve a deep link from the voice assistant application to the mobile banking application (which does offer fingerprint authentication capability) and the navigation to the mobile banking application can give the user the visual impression that they are still in the voice assistant application.

Different extension capabilities can be added using deep links. For example, the extension capability to display further details for a Notification Message (e.g. a notification is a message that an operating system can display in the Notification Drawer outside the applications user interface to provide the user with reminders and communication from other people). Embodiments described herein can use deep linking capability to display fast and detailed information to the user about the notification through the Notification Drawer without losing the context of the notification message.

The following provides an example for notification messages. A notification message can display a very short description that there was a debit to a client's savings account. Using the deep linking capability, a mobile device (programmed according to embodiments described herein) can display the details about the notification by displaying the following fields: amount, from account, to account, date, time, location and notes (if any) about the transaction.

As another example, the extension capability can be used for Short Message Service (SMS) as well. Applications send SMS (either informational or actionable) to their users to communicate indirectly. Users can open a Messaging Application to read the SMS. The SMS can contain links to perform verification to the users. On clicking the link, embodiments described herein can utilize the deep linking capability to render the necessary details and provide users with options to perform an action without leaving the Message Application.

The following provides an example for SMS messages. An SMS contains a link to accept terms and conditions to activate an account with an organization. We can leverage the extension capability to display the terms and condition to the user and provide an activate button. This can allow the user to fulfill the account activation without leaving the Messaging
Application.

As a further example, the extension capability can also be used in order to fulfil an action on an email service. Embodiments described herein can leverage a deep link from an email service to fulfil an action that the user is required to perform on an email without leaving the email application.

The following provides an example for email messages. An email service can contain an account set up complete action for the user. A user opens up the email application, selects the email, clicks on the link to enter required additional account information (address, phone number and location etc.) and submits to complete the account set up. Using the deep linking capability, the account set up can be completed without leaving the email application.

Figure 5:
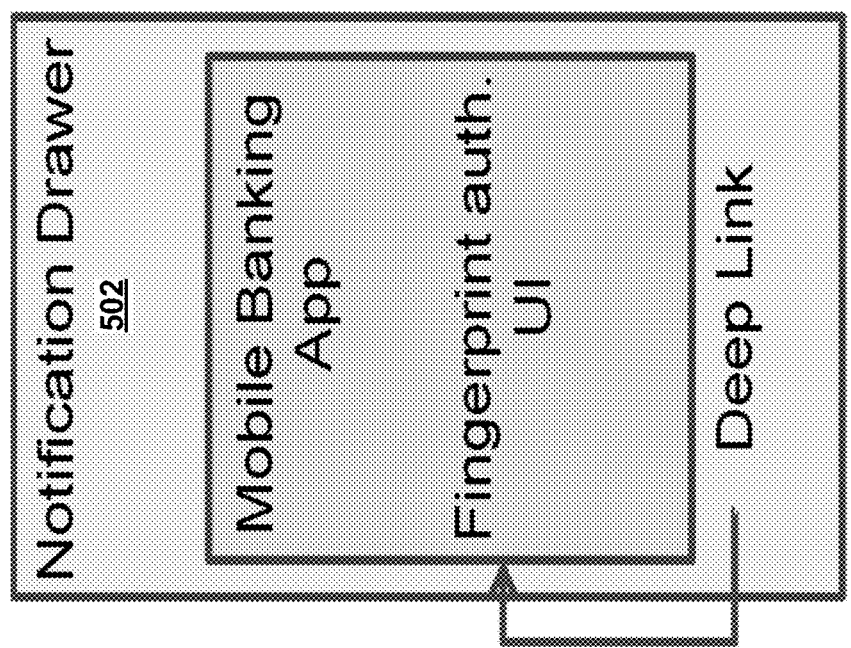
FIG. 5 depicts an application extension for a notification drawer as an example use case.

FIG. 5 depicts an application extension for a notification drawer 502 as an example use case. A notification is a message that an operating system can display in the Notification Drawer outside the application's UI to provide the user with reminders and communication from third parties, and so on. The notification drawer can be the application to be extended and the mobile banking application can be the application that provides the extension.

The notification drawer might not have the capability to conduct fingerprint (or biometric) authentication. An extension point that would enable this kind of capability also might not exist. Embodiments described herein can involve a deep link from the notification drawer to the mobile banking application (which does offer fingerprint authentication capability) while giving the user the impression that they are still operating in the notification drawer.

For the notification drawer, an example workflow can relate to push notification functionality in native operating system notification bar. An example program function can generate bank account related alerts such as a low balance alert. When the user clicks a button for the alert, the interface can update to present dialog which can visual appear like it is in the notification bar context or environment rather than explicitly switching to mobile banking application. The mobile banking application can ask for a fingerprint (or other biometric) verification before activating different program functions. The mobile banking application can complete transfer of funds in response to low balance.

Figure 6:
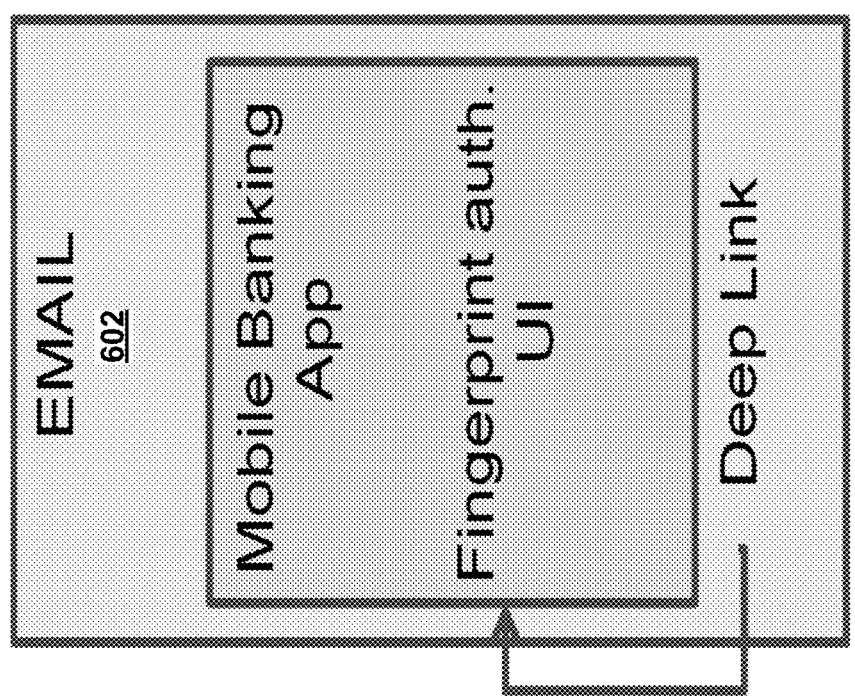
FIG. 6 depicts an application extension for electronic mail as an example use case.

FIG. 6 depicts an application extension for electronic mail 602 as an example use case. A banking system can offer different money transfer services such as, for example, Receive Email Money Transfer (EMT) to transfer money from an account using an email address. The EMT application can be the application to be extended, and the mobile banking application can be the application that provides the extension. The email application (or message) for Receive EMT application might not have capability to conduct fingerprint authentication. An extension point that would enable this kind of capability also might not also exist Embodiments described herein can involve a deep link from an email application (or message) for Receive EMT to the mobile banking app (which can offer fingerprint authentication capability) while giving the user the impression that they are still operating in the email application. For the example workflow, a user can receive an email message with a deep link to a mobile banking application. When the user selects or activates the deep link then, in an example, a dialog extension point (e.g. visual element) can overlay on the interface of the email application (e.g. query pop-up) or appears in line with the email so that user believes they are still in the context of the email application. The user can issue commands to activate different program functions of the mobile banking application. For example, the commands can bring up notification of transfer amount, ask for fingerprint verification or other biometric verification, select account, request for password, and so on. The user can use the email application to access the program functionality of the mobile banking application and does not need to explicitly or noticeably open the mobile banking application to receive the electronic money transfer.

Referring back to the example use case involving a voice assistant application, a user can interact with the voice assistant using voice commands. For example, a voice assistant application can be launched by the user when he said "Okay friend, talk to Bank Helper". The user continues to interact with the voice assistant by saying commands such as "Pay bills, Teleco Canada, 14 dollars . . . ", and so on. The voice assistant can trigger activation of the deep link. The voice assistant can utter "Can I send you to the Banking Mobile App to complete your transaction". The user can respond with "yes please", and the voice assistant can activate the deep link to extend its functionality. This can display dialog of a screen in the Mobile Banking Application (instead of voice assistant). This screen provides biometric authentication capability and subsequently scans the users fingerprint and authenticates the user. It is important to note that although the user device was directed to the deep link, there might be no perception of navigating away from voice assistant. Embodiments described herein allow the user experience to stay within the originating application, which is a behavior of an application extension.

Other example applications include a text message interface or a messaging service. An application can integrate with an input device such as a keyboard and can link a command to a key to create a function of the key. For example, there can be a "money transfer key" to invoke the deep link in the first application to trigger a program function for money transfer. Visual elements of the interface for the money transfer program function can be configured to be visually similar to visual elements of the interface for the originating application. The deep link can indicate the originating or source application. This can be used for context to configure the visual elements for consistency in appearance. For this example the originating application can be a message application and the interface can update with an overlay box (e.g. visual element) to make it look like the user has not navigated away from the chat or message application interface. The deeplink can extend or expose payment functionality into a chat or message application.

Figure 7:
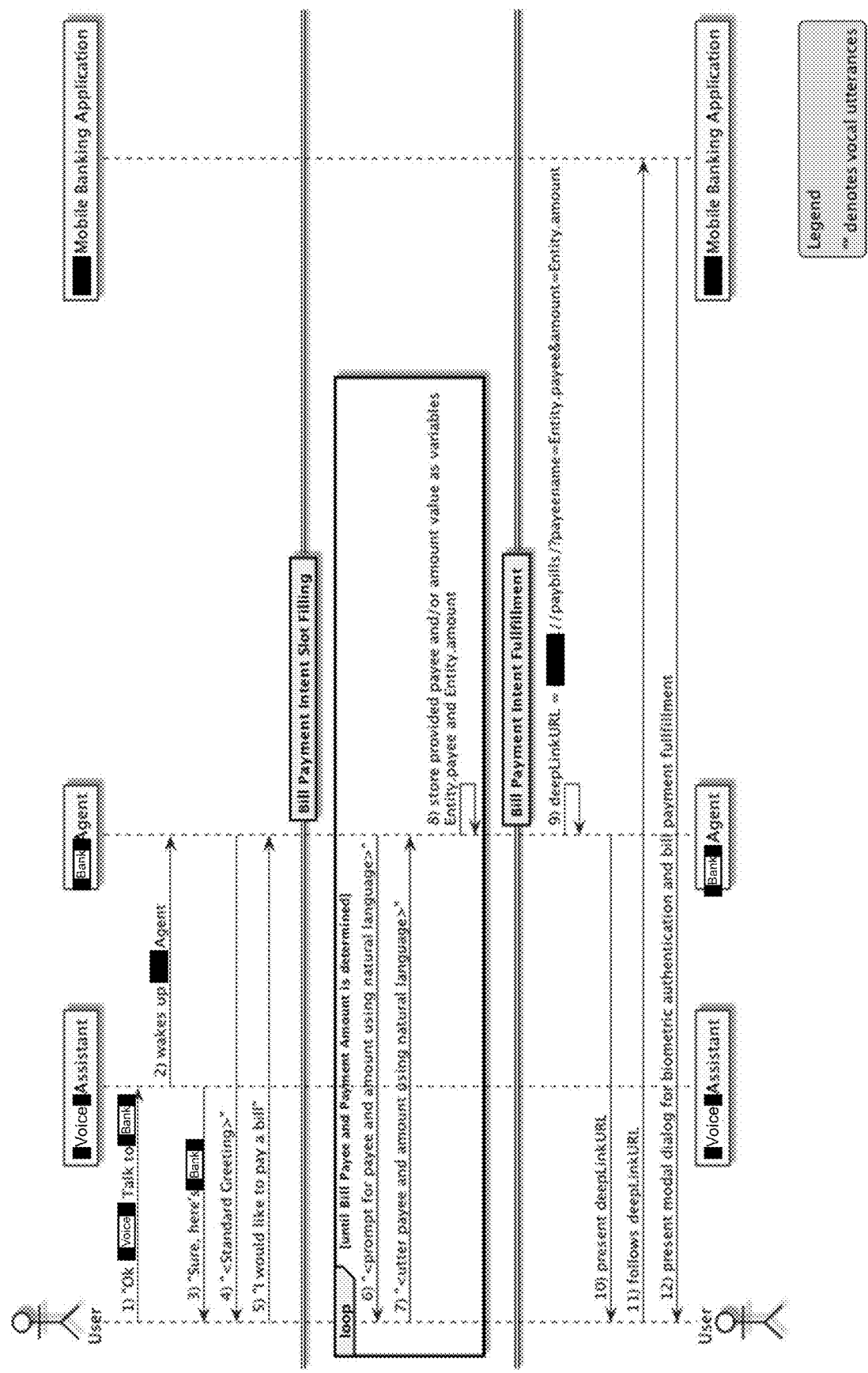
FIG. 7 depicts an example process for a voice assistant and mobile application according to embodiments described herein.

FIG. 7 depicts an example process for a voice assistant and mobile application according to embodiments described herein. Steps 1 through 4 describe the user instructing the voice assistant to activate a banking conversational agent. This can involve different voice commands such as "wake up bank agent" and "I would like to pay a bill or make a payment", for example.

At step 5, the voice assistant and the bank agent receive a command indicating a bill payment request.

The banking conversational agent can enter a "Slot Filling" state described in steps 6, 7 and 8. Slots can indicate required parameters for the program code to fulfill an intent. For bill payment, example slots can be the payee name and amount. The bank conversational agent can use natural language utterances to prompt the user, and can continue to do so until the user fills all the slots. The data collected for slots can be stored as variables Entity.payee and Entity.amount, for example.

The banking conversational agent enters the "fulfillment" stage starting in step 9 once input data is collected for all the slots. Slot values can be encoded into a deep link URL as illustrated in step 9. For example, slots corresponding to the payee and amount of a bill payment intent maybe encoded as ?payeename=ABCommunications&amount=10 as per query parameters defined in RFC3986 (https://tools.rf.org/html/rfc3986#section-3.4).

A custom URI or URL scheme "bankaog" can be used. This custom URI scheme instructs the operation system to direct the deep link to the mobile banking application, and allows the mobile banking application to identify the source of the deep link. For example, for an operating, the application developer may define "intent filters" on the scheme "bankaog" in the application manifest, which instructs the operating system to direct all intents to open URLs with the scheme "bankaog" to the said application. Such intent filter might look like the following:

```
<intent-filter>
    <action android:name="android.intent.action.VIEW" />
    <category android:name="android.intent.category.DEFAULT" />
    <category android:name="android.intent.category.BROWSABLE" />
    <data android:scheme="bankaog" android:host="bank" />
</intent-filter>
```

Further verification of the source of the deeplink may be conducted via a pre-share secret between the sender and the receiver, where the pre-shared secret is sent via the deeplink (via a query parameter) and verified by the application.

The deep link can be presented to the user and subsequently followed in step 10 and 11.

The mobile banking application parses the deep link URL and extracts the bill payee and amount. Step 12 involves presenting the model dialog for biometric authentication and bill payment fulfillment. The mobile banking application can take over the UX, and subsequently completing the fulfillment of the bill payment intent.

For the email example, the deep link can have application specific information. The deep link can indicate what feature or program function the link is planning to access (e.g. authentication, fund transfer page, e-transfer receipt page). When the deep link is invoked or activated then link messages can be generated and handled by deep link handler for the OS/runtime specific to the environment. The OS can take over routing of the messages and recognizes from the deep link that the banking application should be invoked and passes the information identifying the feature or point in the application to access.

The banking application can have visual elements based on what access the user wants to perform. For example, there can be a floating dialog that makes it feel like it is part of the originating application system. The additional visual elements do not have to take up the entire interface and there does not need to be a visual change of context.

The deep link can encode the source application (e.g. the originating application). This source information can be used to generate visual elements for other applications that have a consistent look and feel to the source application. The information can be encoded in the deep link. The encoded data can be used for dynamic visual element configuration to respond to multiple environments depending on the source application or originating application.

Figure 8:
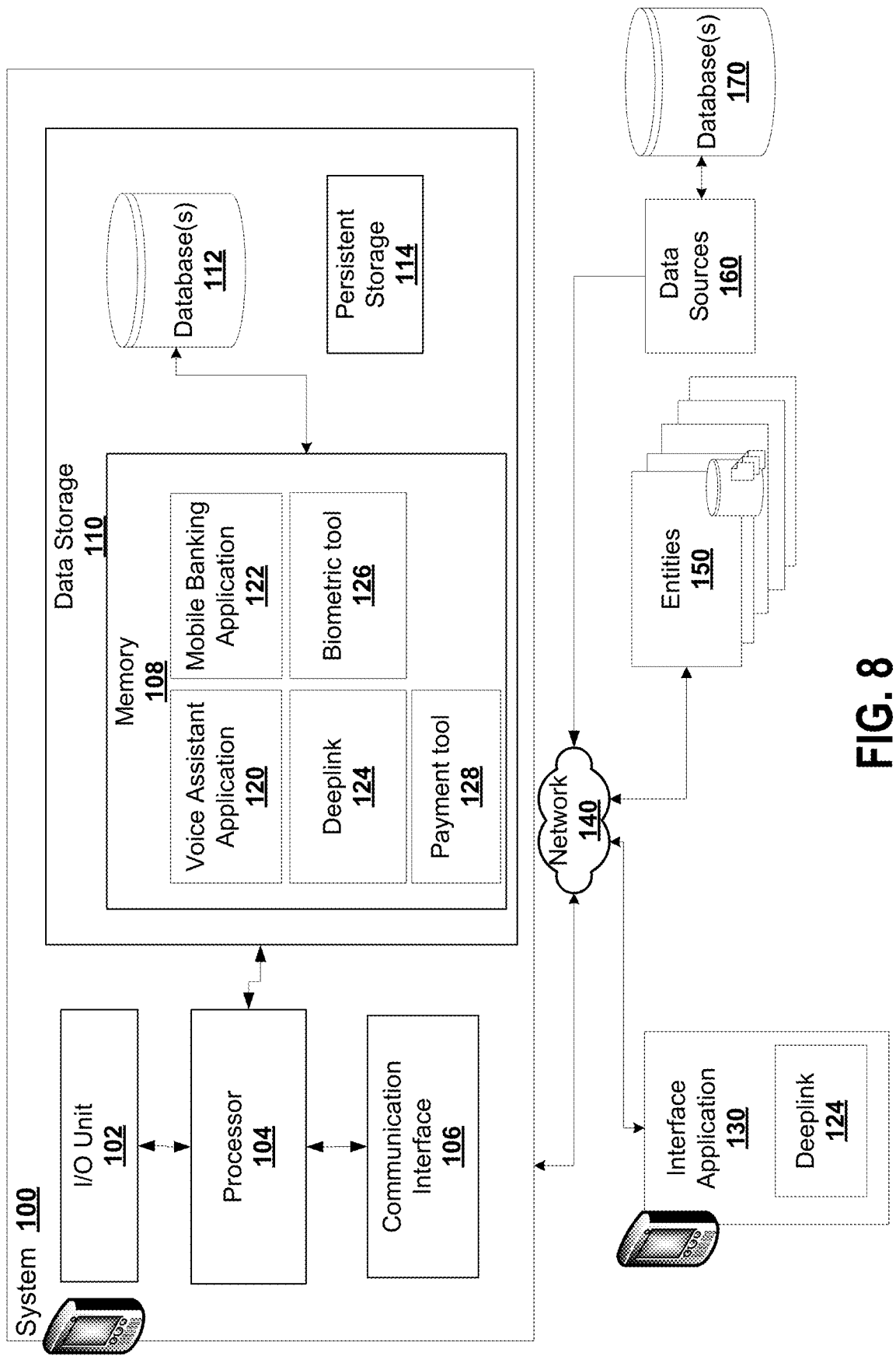
FIG. 8 depicts a system for extending capabilities of a voice assistant application according to some embodiments.

FIG. 8 depicts a system for extending capabilities of a voice assistant application according to some embodiments.

The system 100 can include an I/O Unit 102, a processor 104, communication interface 106, and data storage 110. The processor 104 can execute instructions in memory 108 to implement aspects of processes described herein. The processor 104 can execute instructions in memory 108 to configure a voice assistant application 120, mobile banking application 122, deeplink 124, biometric tool 126, payment tool 128, and other functions described herein. The system 100 may be software (e.g., code segments compiled into machine code), hardware, embedded firmware, or a combination of software and hardware, according to various embodiments. The system 100 may reside a mobile device of a user for example. The system 100 may reside at a dedicated hardware application for a voice assistant, for example. The system 100 may connect with an interface application of a mobile device and or voice assistant in some embodiments.

The voice assistant application 120 can be the application to be extended. In this example, the mobile banking application 122 can be the application that provides the extension. For example, a voice assistant might not have capability to conduct fingerprint (or biometric) authentication and bill payment function. An extension point within the voice assistant application 120 that would enable this kind of capability might not exist. The mobile banking application 122 can have a biometric tool for fingerprint authentication capability and a payment tool 128 for a bill payment or money transfer function. Embodiments described herein can involve a deep link 124 from the voice assistant application 120 to the mobile banking application 122 (which does offer fingerprint authentication and bill payment capability). The navigation to the mobile banking application can generate a visual impression at the UI similar or consistent with the voice assistant application.

The voice assistant application 120 can implement voice to text processing and text to voice processing to process voice commands or utterances and generate/transmit responses. The mobile banking application 122 can integrate with a bank system to provide account functions, for example.

The system 100 can be for extending an application and in this example the application to be extended is the voice assistant application 120, but other applications can also be extended in other example use cases. For example, the application to be extended by the deep link 124 can be a notification drawer or an email application for money transfer.

The system 100 can configure a deep link 124 within a first application (e.g. voice assistant application 120) to direct the processor 104 to a program function (e.g. biometric tool 126, payment tool 128) of a second application (e.g. mobile banking application 122). The first application might not provide the program function or have the capability of the program function. In some embodiments, the deep link 124 creates an extension of the first application that would otherwise not be extensible due to the lack of an appropriate extension point. In some embodiments, the deep link creates an extension in the form of a model dialog or updates the interface to resemble a model dialog. The system 100 can generate the deep link 124 and embed the deep link 124 in the source or originating application (e.g. voice assistant application 120) to direct the processor 104 to a program function (e.g. biometric tool 126, payment tool 128) of the extension application (e.g. mobile banking application 122). The system 100 can generate the deep link 124 with parameters and data to be used to configure the elements of the program function for the extension application to provide a consistent user experience in relation to the source or originating application.

Upon activation of the deep link, the processor 104 directs an interface (e.g. an interface displayed at system 100 or an external interface application 130, for example) to the program function of the second application. The processor 104 updates the interface to implement the program function while maintaining a consistent visual appearance at the interface. This may give the impression that the interface is visually the same for both the first application and the second application so that the user is not aware that they are directed to another application. In some embodiments, the deep link directs to the interface to a user interface of an application of the second application, the application providing the program function. In some embodiments, the processor can update the interface with a model dialog to implement the program function.

The deep link 124 can be used to extend functionality of the voice assistant application 120. The deep link 124 can be an HTTP URL, for example with embedded data that can call the mobile banking application 122 to run a program function such as, e.g. biometric tool 126, payment tool 128. The processor 104 can customize the interface of the mobile banking application 122 to make it visually similar to the interface of the voice assistant application 120 so it can appear as though the user did not leave the voice assistant application 120. Embodiments described herein can provide the deep link 124 from the first application to a particular program function in the second application, and displaying the second application program function with an interface that looks like the first application (e.g. voice assistant application 120). This can apply to any situation where an application with limited functions (e.g. navigational functions) can now call functions from any other program using these deep links.

In some embodiments, the processor 104 can transmit requests for parameters for the program function and receive input data for variables for the parameters. The processor 104 can store the variables for the parameter and encodes the variables in the deep link 124. In some embodiments, the mobile banking application 122 can parse the deep link 124 to extract the encoded variables for the program function. In some embodiments, the deep link 124 can enable the mobile banking application 122 to identify that the source of the deep link 124 is the voice assistant application 120.

In some embodiments, the processor 104 is configured to implement the process of FIG. 7. For example, the processor 104 can receive a voice command to activate the mobile banking application; generate a voice response to request the payee and amount using natural language processing; receive utterances to generate entity.payee and entity.amount variables; store the entity.payee and entity.amount variables; generate the deep link embedding the entity.payee and entity.amount variables; and activate the deep link to present a model dialog to enable the bill payment function and the biometric authentication function.

The I/O unit 102 can enable the system 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the system 100 to communicate with other components, to exchange data with other components, to access and connect to network resources, to serve applications, and perform other computing applications by connecting to a network 140 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these.

The system 100 can be operable to register and authenticate users (using a login, unique identifier, and password for example) prior to providing access to applications, a local network, network resources, other networks and network security devices. The system 100 can connect to different machines, entities 140, and/or data sources 150 (linked to databases 160).

The data storage 110 may be configured to store information associated with or created by the system 100, such as for example bank account data, biometric data, voice commands, and so on. The data storage 610 may be a distributed storage system, for example. The data storage 110 can implement databases, for example. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

Figure 9:
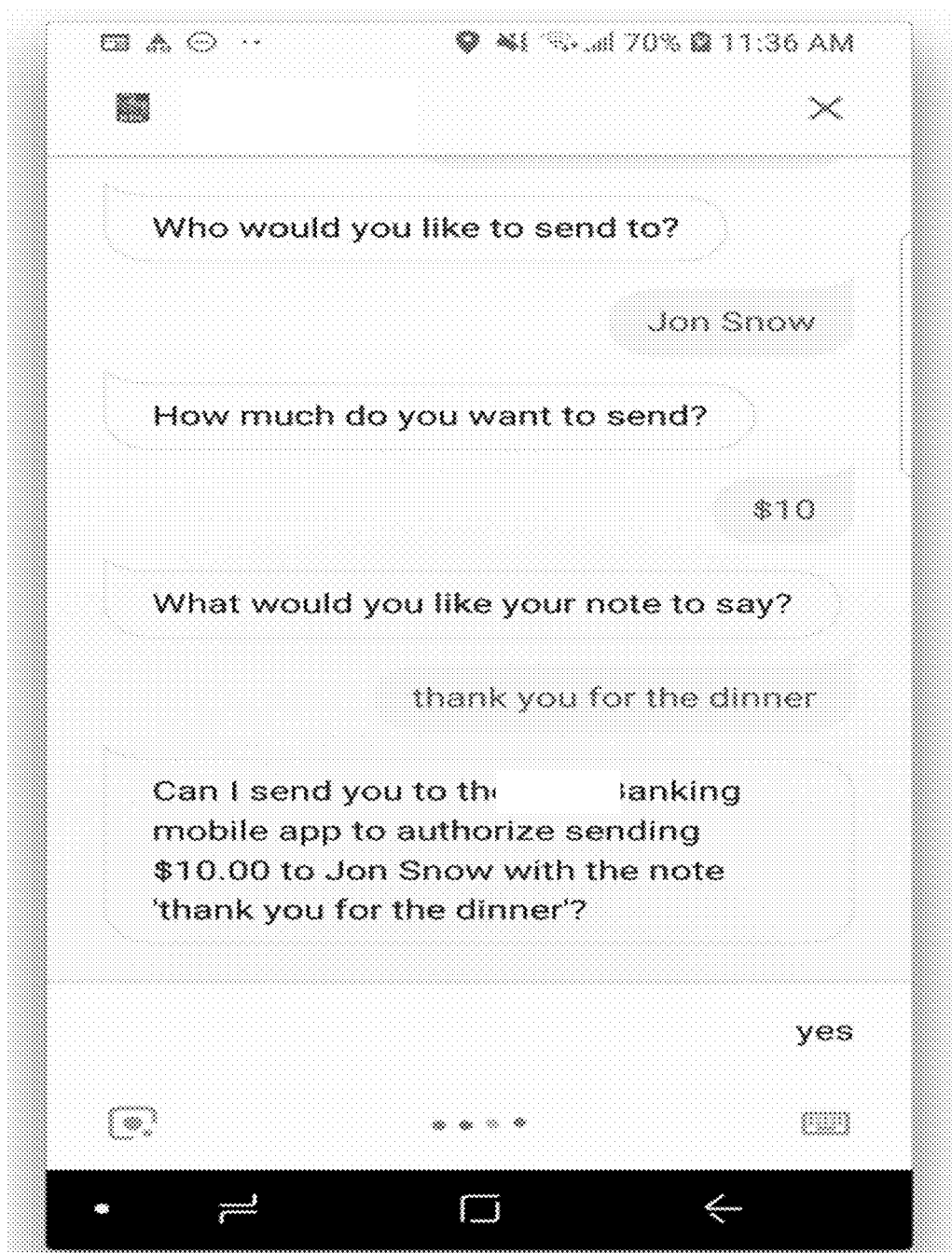
FIG. 9 shows an example interface for a messaging application.

FIG. 9 shows an example interface 900 for a messaging application.

The voice assistant application can have deep linking to provide an extension of its program functionality. The context environment for the interface can be consistent to present a transparent extension to the user to fulfill the transaction that not only creates the smooth experience for the user but also as a user one feels the connected experience without a loss of context. The interface and workflow can save several clicks for the user to complete the transaction by opening the separate applications independently. The interface can display visual elements from different applications while maintaining a consistent user experience.

The banking application can be invoked to send money while the user is in the chatting or messaging application. For example, a text command can trigger the banking application.

Figure 10:
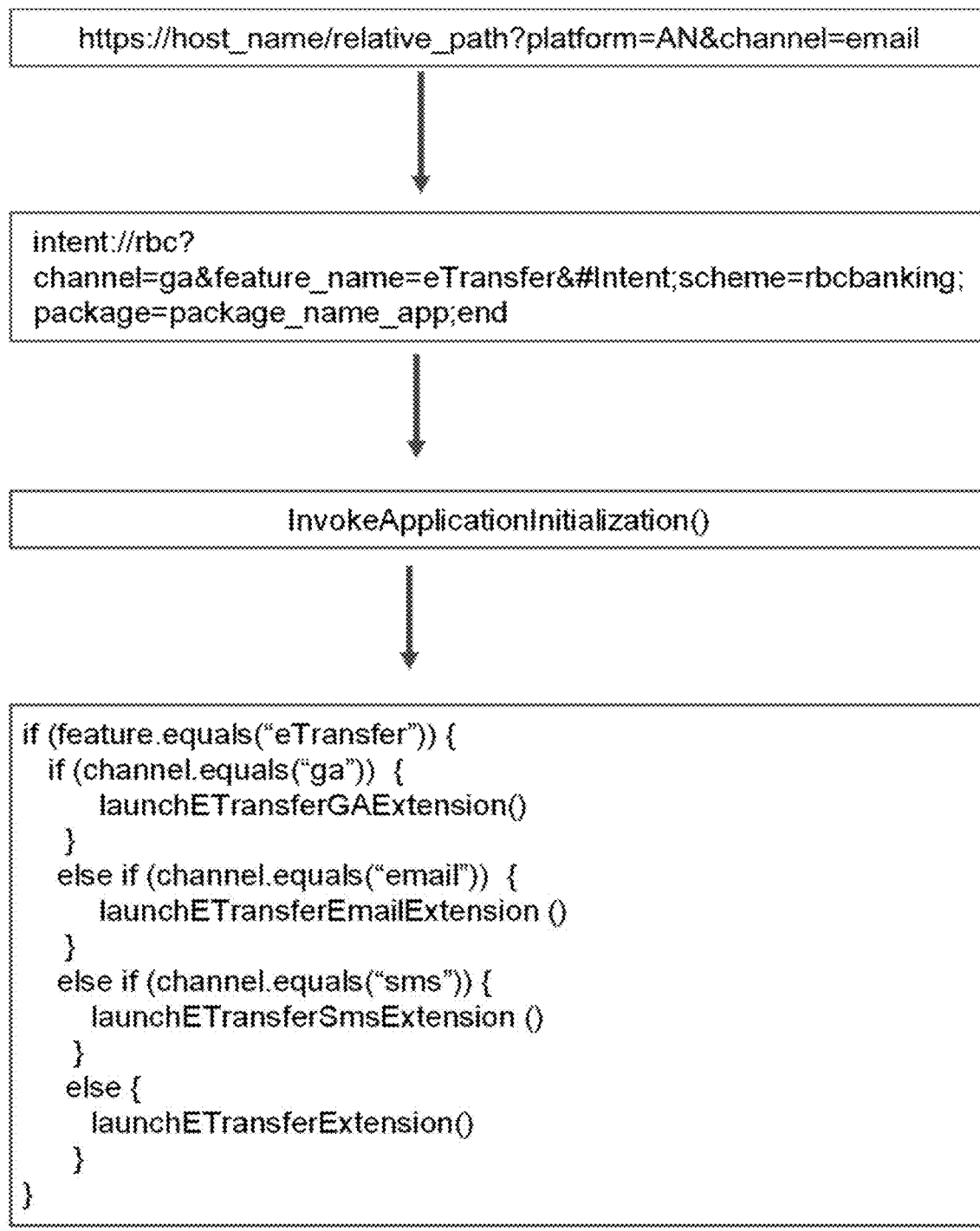
FIG. 10 shows example instructions for a deep link extension.

FIG. 10 shows example instructions 1000 for a deep link extension. The deep link can direct the interface for the messaging application to display visual elements for a banking application.

FIG. 11 shows example interfaces 1100, 1102 for a banking application. In this example, the banking application has money transfer 1106 program function. The banking application can also have biometric verification 1104 as a program function to authorize the money transfer.

FIG. 12 shows example interfaces 1200, 1202, 1204 for a message application. The user fulfills the transaction of sending money within the chatting window and user will not lose the context of the interface environment and maintains a consistent user experience. The visual appearance is consistent with the originating application. The workflow is more efficient for the user and can save several clicks to send money by opening the full-fledged banking application. The interface can display a list of different users for the transaction.

Figure 13:
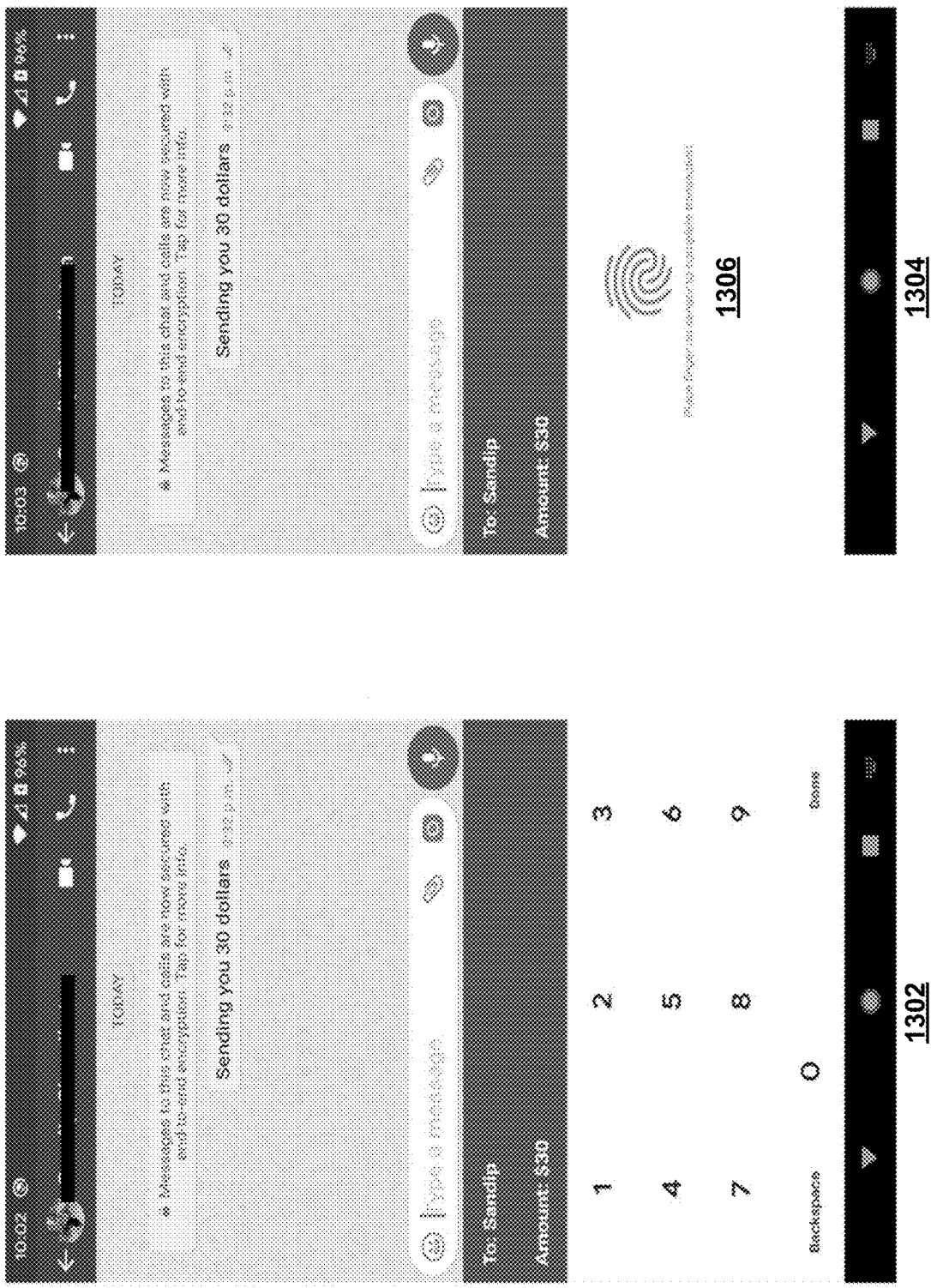
FIG. 13 shows example interfaces with visual elements for a banking application along with visual elements for the message application.

FIG. 13 shows example interfaces 1302, 1304 with visual elements for a banking application along with visual elements for the message application. The visual elements can also correspond to biometric verification 1306 program function from the banking application. The interface 1302, 1304 shows the visual elements from both applications to provide a consistent user experience and visual appearance. The workflows of the applications can also integrate to provide an efficient user experience.

The deep link can be activated within the messaging application. The deep link has executable instructions for directing one or more processors to a program function of the banking application. The program function is not provided by the messaging application. The deep link is activated to direct the interface to the program function of the banking application using the one or more processors. The interfaces 1302, 1304 maintain a consistent user experience while executing the program function of the other (banking) application with the context of the messaging application. The consistent user experience is a consistent visual appearance in this example. Another experience may be an audio experience.

The interfaces 1302, 1304, show visual elements for the messaging application and additional visual elements for the banking application. The additional visual elements can be configured to have a similar visual appearance to the visual elements for the messaging application. The deep link can be parsed to extract data indicating the source application in order to configure the additional visual elements for visual consistency.

Figure 14:
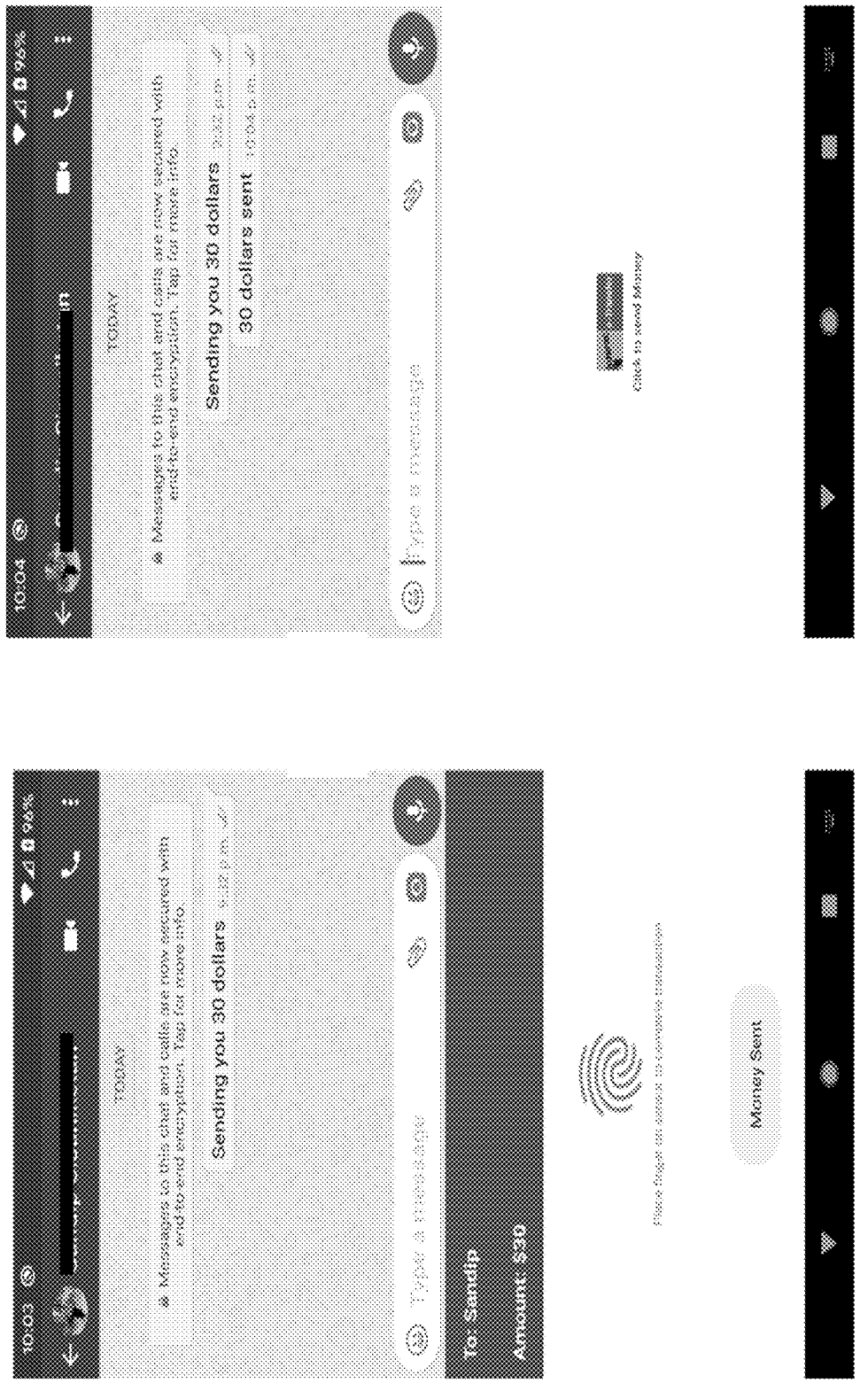
FIG. 14 shows example interfaces with visual elements for a banking application and a messaging application.

FIG. 14 shows example interfaces 1402, 1404 with visual elements for a banking application and a messaging application.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. Non-transitory computer readable storage medium with executable instructions for causing one or more processors of an electronic device to extend a first application by:
   generating a deep link with parameters and data to configure elements of a program function of a second application and embedding the deep link within the first application to direct the processor of the electronic device to the program function of the second application, the program function not provided by the first application;
   upon activation of the deep link by the electronic device, directing an interface of the first application to the program function of the second application and updating the interface of the first application to implement the program function of the second application at the electronic device; and
   maintaining a consistent user experience at the interface while executing the program function of the second application using the parameters and data of the deep link to configure the elements of the program function of the second application, wherein the consistent user experience is a consistent visual appearance at the interface, wherein maintaining the consistent visual appearance at the interface involves configuring visual elements for the first application and visual elements for the second application to display at the interface with a similar visual appearance and displaying the visual elements for the first application and the visual elements for the second application at the interface, wherein the configuration is based on parameters or data of the deep link.

2. The computer readable storage medium of claim 1 wherein maintaining the consistent visual appearance at the interface involves displaying, within the interface, additional visual elements for the second application, the additional visual elements configured to have a similar visual appearance to visual elements for the first application based on parameters or data of the deep link.

3. The computer readable storage medium of claim 1 wherein the deep link creates an extension of the first application that would otherwise not be extensible due to the lack of an appropriate extension point.

4. The computer readable storage medium of claim 1 wherein the deep link creates an extension in the form of a model dialog or updates the interface to resemble a model dialog.

5. The computer readable storage medium of claim 1 wherein the deep link directs the interface to a user interface of an application of the second application, the application providing the program function.

6. The computer readable storage medium of claim 1 wherein the first application is a voice assistant application.

7. The computer readable storage medium of claim 1 wherein the second application is a mobile banking application.

8. The computer readable storage medium of claim 1 wherein the program function is biometric authentication.

9. The computer readable storage medium of claim 1 wherein the program function is fingerprint authentication.

10. The computer readable storage medium of claim 1 wherein the program function is a bill payment or money transfer function.

11. The computer readable storage medium of claim 1 wherein the first application is a notification drawer.

12. The computer readable storage medium of claim 1 wherein the first application is an email application for money transfer.

13. The computer readable storage medium of claim 1 wherein the processor can update the interface to with a model dialog to implement the program function.

14. The computer readable storage medium of claim 1 wherein the processor can transmit requests for parameters for the program function, receive input data for variables for the parameters, store the variables for the parameter, and encodes the variables in the deep link.

15. The computer readable storage medium of claim 14 wherein the second application can parse the deep link to extract the encoded variables for the program function.

16. The computer readable storage medium of claim 1 wherein the deep link indicates a feature or point in the second application to access.

17. The computer readable storage medium of claim 1, wherein the deep link can enable the second application to identify that the source of the deep link is the first application.

18. A non-transitory computer readable storage medium with executable instructions for causing one or more processors of an electronic device to extend a first application by:
  generating a deep link with parameters and data to configure elements of a program function of a second application and embedding the deep link within the first application to direct the processor of the electronic device to the program function of the second application, the program function not provided by the first application;
  upon activation of the deep link by the electronic device, directing an interface of the first application to the program function of the second application and updating the interface of the first application to implement the program function of the second application at the electronic device; and
  maintaining a consistent user experience at the interface while executing the program function of the second application using the parameters and data of the deep link to configure the elements of the program function of the second application;
wherein the first application is a voice assistant application, wherein the second application is a mobile banking application, wherein the program function is a bill payment function and a biometric authentication function, wherein the executable instructions cause the one or more processors to extend the first application by:
  receiving a voice command to activate the mobile banking application;
  generating a voice response to request the payee and amount using natural language processing;
  receiving utterances to generate entity.payee and entity.amount variables;
  storing the entity.payee and entity.amount variables;
  generating the deep link embedding the entity.payee and entity.amount variables;
  activating the deep link to present a model dialog to enable the bill payment function and the biometric authentication function.

19. A method for extending an application of a computer system comprising:
  generating a deep link with parameters and data to configure elements of a program function of a second application and embedding the deep link within a first application to direct one or more processors of an electronic device to the program function of the second application, the program function not provided by the application;
  receiving, at an interface for the first application, a command to activate the deep link within the first application, the deep link having executable instructions for directing the one or more processors to the program function of the second application, the program function not provided by the first application;
  activating the deep link to direct the interface to the program function of the second application using the one or more processors of the electronic device;
  maintaining a consistent user experience at the interface while executing the program function of the section application using the parameters and data of the deep link to configure the elements of the program function of the second application, wherein the consistent user experience is a consistent visual appearance, wherein maintaining the consistent visual appearance at the interface involves configuring visual elements for the first application and visual elements for the second application to display at the interface with a similar visual appearance and displaying the visual elements for the first application and the visual elements for the second application at the interface, wherein the configuration is based on parameters or data of the deep link.

20. The method of claim 19 further comprising automatically displaying, within the interface, visual elements for the first application and additional visual elements for the second application, the additional visual elements configured to have a similar visual appearance to the visual elements for the first application.

21. A method for extending an application of a computer system, the method comprising:
  generating a deep link with parameters and data to configure elements of a program function of a second application and embedding the deep link within a first application to direct one or more processors of an electronic device to the program function of the second application, the program function not provided by the application;
  receiving, at an interface for the first application, a command to activate the deep link within the first application, the deep link having executable instructions for directing the one or more processors to the program function of the second application, the program function not provided by the first application;
  activating the deep link to direct the interface to the program function of the second application using the one or more processors of the electronic device;
  maintaining a consistent user experience at the interface while executing the program function of the section application using the parameters and data of the deep link to configure the elements of the program function of the second application;
wherein the first application is a voice assistant application, wherein the second application is a banking application, wherein the program function is a bill payment function and a biometric authentication function, wherein the method comprises:
  receiving, at the interface, a voice command to activate the banking application;
  generating a voice response to request the payee and amount using natural language processing;
  receiving utterances to generate entity.payee and entity.amount variables;

storing the entity.payee and entity.amount variables;
generating the deep link embedding the entity.payee and entity.amount variables; and
activating the deep link to present a model dialog to enable the bill payment function and the biometric authentication function of the banking application.

\* \* \* \* \*